UNITED STATES PATENT OFFICE

2,803,688

AMMONIUM AND HYDRAZINIUM HYDRAZINE SULFINATES AND LOW MOLECULAR WEIGHT DERIVATIVES THEREOF AS BLOWING AGENTS FOR SYNTHETIC RESINS AND NATURAL RUBBER

Norman W. Dachs, Buffalo, N. Y., assignor to Olin Mathieson Chemical Corporation, a corporation of Virginia No Drawing. Application October 10, 1952,
Serial No. 314,200

13 Claims. (Cl. 260—724)

My invention relates to improvements in blowing agents for the manufacture of porous rubber and plastic articles. Foamed articles of plastics or rubber are prepared by various means including solution of nitrogen under high pressures and subsequent release of the pressure. A simpler method is to incorporate in the rubber or plastic composition a suitable chemical agent which, on heating to vulcanization or molding temperatures, releases large quantities of gas and thus causes foaming of the composition. Sodium bicarbonate has been widely used for this purpose but suffers several disadvantages. Uniform incorporation in the rubber or plastic is difficult because of the insolubility of sodium bicarbonate. Also, relatively large and non-uniform bubbles are usually formed which adversely affects the mechanical properties of the product. Blowing agents of organic structure such as benzene sulfonyl hydrazide and p,p'-oxybis (benzene sulfonyl hydrazide) have been proposed which have the advantage of being relatively soluble in rubber and plastics so that their uniform incorporation is relatively easy, but they are expensive and relatively deficient in other requirements. Thus, desirable supplementary properties in a blowing agent include ready solubility in rubber and plastics, the absence of discoloration of light colored materials, the absence of toxic or odorous residues, the absence of any effect on the cure of rubber and, for desirable mechanical properties, the formation of fine uniform bubbles and the production of the maximum proportion of non-condensable gas per gram of the blowing agent.

According to my invention, special advantages are obtained in the production in foamed form of polymeric materials having a visco-elastic stage by the use of a blowing agent selected from the class consisting of ammonium and hydrazinium hydrazine sulfinates and low molecular weight derivatives thereof. The blowing agents of my invention produce in general two to three times as much gas or more per gram as previously known blowing agents. The best of the known blowing agents produces approximately 100–110 ml. of non-condensable gas per gram of agent decomposed at about 180° C. For example, one gram of dihydrazinium hydrazinedisulfinate produces as much as about 350 ml. of non-condensable gases per gram at 160° C. Thus, with this blowing agent less than one-third as much is required to produce the same volume of gas.

The new blowing agents include, by way of example, diammonium hydrazine disulfinate (NH₄—SO₂—NH—NH—SO₂—NH₄)

dihydrazinium hydrazine disulfinate (NH₂—NH₃—SO₂—NH—NH—SO₂—NH₃—NH₂)

ammonium hydrazinium hydrazine disulfinate (NH₄—SO₂—NH—NH—SO₂—NH₃—NH₂)

diammonium hydrazine carboxy sulfinate (NH₄—SO₂—NH—NH—CO₂—NH₄)

dihydrazinium hydrazine carboxy sulfinate (NH₂—NH₃—SO₂—NH—NH—CO₂—NH₃—NH₂)

and the like.

The blowing agents may be prepared by reaction of sulfur dioxide or of sulfur dioxide and carbon dioxide with hydrazine, ammonia and hydrazine or a mixture of hydrazine and an ammonium or hydrazinium derivative, advantageously in organic solution. The proportion of sulfur dioxide to hydrazine advantageously is adjusted to provide at least one sulfinate group linked to hydrazine, and the proportions of reactants are controlled to provide at least two additional ammonium or hydrazinium groups and an additional sulfinate or other gas forming linkage such as a carboxy group. The relative proportions of sulfur dioxide and carbon dioxide, where the latter is employed, may be varied from 100 percent sulfur dioxide designed to result in a disulfinate to about 50 percent sulfur dioxide designed to result in a monosulfinate. In addition to the ammonium, hydrazinium or mixed ammonium hydrazinium products, other basic nitrogen salts may be formed by employing ammonium or hydrazine derivatives such as the aminoguanidines or simple hydrazine derivatives such as methyl or dimethyl hydrazine. Thus it may be generally stated that the blowing agents of my invention can be generally described by the following formula:

Y—XO₂—NH—NH—SO₂—Y in which X represents either a carbon or a sulfur atom and Y represents either a hydrazinium or ammonium radical.

Although the new blowing agents are technically inorganic materials they possess the advantage of compatibility with the organic components of the rubber or plastic mixtures to be treated and decompose substantially to gaseous products with very little residue. The new agents have excellent blowing activity and yet possess the chemical stability necessary for commercial handling. The new agents in general result in a different type of blow than that produced by agents evolving carbon dioxide as the primary decomposition product. Instead of the carbon dioxide type blow, the new agents produce a characteristically nitrogen type blow provided at least one mole of sulfur dioxide is included in the molecule, and the products are characterized by the very fine pore, unicellular nature of the foamed products.

Most of the organic blowing agents previously known evolve gas on heating to suitable temperatures, for example, 130 to 180° C. fairly rapidly at first. Subsequently the rate decreases as decomposition approaches completion. It is a particular advantage of the new blowing agents that the non-condensable gases are evolved extremely rapidly at desirable vulcanization temperatures. Thus, to obtain 98.5 percent of the total amount of non-condensable gas practically available at 160° C. requires only 5 minutes with dihydrazinium hydrazine disulfinate but 50 minutes with p,p'-oxybis (benzene sulfonyl hydrazide). Shorter molding and vulcanization cycles are possible allowing the production of more articles per mold per hour.

It is a further feature of the blowing agent of the present invention that the decrease in volume of gas per gram with decreasing temperatures is less than with previous agents. Thus at 135° C. my blowing agent liberates about 94 percent as much gas as at 166° C., whereas p,p'-oxybis (benzene sulfonyl hydrazide) liberates only about 46 percent as much gas at 131° C. as at 160° C. It is thus possible to use lower temperatures which extends mold life and, by shortening cooling periods, speeds subsequent operations.

It is a further feature of the present invention that at lower temperatures the non-condensable gases are evolved more slowly and may even be formed in two more or less distinct stages, separted by a relatively quiescent stage. Thus dihydrazinium hydrazine disulfinate on heating at 130° C. evolves about 173 ml. of gas per gram in about 15 minutes and after a total of about 40 minutes an additional 110 ml. are evolved. Although I do not limit my invention by theoretical speculation, the evolution of gas in two stages appears to be particularly advantageous in producing the unusually fine and uniform distribution of gas bubbles obtainable with the new blowing agents. By careful control of temperature it is thus possible to obtain a considerably slower gas evolution in cases where that is desirable without substantial reduction in the total volume of gas evolution. This property insures that gases will be evolved during the vulcanization and that the rubber walls of the bubbles will retain this shape after the blowing.

The preparation of the new blowing agents is typified by dihydrazinium hydrazine disulfinate,

NH₂NH₂—HSO₂NHNHSO₂H—NH₂NH₂ which has been described by Ephraim et al. in Berichte 44, 389–90 (1911). It may be prepared by the introduction of 2 moles of sulfur dioxide into a solution of 3 moles of anhydrous hydrazine in six times its weight of alcohol with vigorous stirring. The solid separates and may be removed by filtration, drying at room temperature. Additional quantities of the product may be precipitated by the addition of benzene to the alcoholic solution.

The new blowing agents are applicable to the production in foamed form, of polymeric-materials having a visco-elastic stage. In the application of my invention a small amount of the blowing agent employed, e. g. 1 to 20 parts by weight per 100 parts of the polymer treated is incorporated in a dry mixture or dispersion of the polymer and the resulting composition, is heated under blowing conditions, e. g. at about 100 to 200° C. The rubber or plastic composition ordinarily would include the usual additives and modifiers appropriate for the intended use.

My invention will be further illustrated by reference to the following examples.

Example I

Natural pale crepe rubber was well broken down on a 2-roll mill operating at room temperature. It was then compounded according to the following formula:

| | Parts by weight |
|---|---|
| Natural pale crepe rubber | 100 |
| Calcium stearate | 10 |
| White petrolatum | 10 |
| Deenax (an alkylated phenolic antioxidant) | 1 |
| Zinc oxide | 5 |
| Calcium carbonate | 60 |
| Sulfur | 3 |
| Captax (mercaptobenzothiazole) | 2 |
| Dihydrazinium hydrazine disulfinate | 1 |

A portion of 33.8 grams of this composition was cured for 25 minutes at 310° F. The resulting foamed rubber showed a fine grain, cream color and absence of any tackiness.

As a control, the same formula was used except for the substitution of 10 grams of sodium bicarbonate for 1 gram of dihydrazinium hydrazine disulfinate. Following the same cure it showed somewhat larger pores, was tan colored and somewhat tacky.

Example II

When diammonium hydrazine disulfinate having the formula NH₄—SO₂—NH—NH—SO₂—NH₄ was substituted for dihydrazine disulfinate (1 part) in the formula and procedure of Example I, substantially similar results were obtained.

Example III

A polyvinyl chloride sponge was prepared from Geon 121, a powdered polyvinyl chloride. A thin paste was prepared by mixing together 30 parts by weight of Geon 121, 39 parts by weight of tricresyl phosphate, 0.9 part by weight of dihydrazinium hydrazine disulfinate. This paste was poured into a mold and cured at 310° F. for 15 minutes resulting in a sponge having very fine porosity.

Example IV

Polyethylene was foamed by milling 100 grams of polyethylene on a 2-roll mill carrying 40 lbs. of steam on the front roll. One gram of dihydrazinium hydrazine disulfinate was incorporated by milling for 3 minutes. The resulting sheet was hot pressed for 3 minutes at 340° F. On release, the composition foamed to form porous polyethylene having medium sized cells.

Example V

A polyvinyl chloride sponge was prepared from Geon 121, a powdered polyvinyl chloride. A thin paste was prepared by mixing 40 parts by weight of Geon 121, 14 parts by weight of dioctyl phthalate, 26 parts by weight of tricresyl phosphate, 1.6 parts by weight of an epoxy resin derived from a bis-phenol and epichlorohydrin and 8 parts by weight of dihydrazinium hydrazine disulfinate. This paste was poured into a mold and cured at 320° F. for 12 minutes resulting in a sponge having fine porosity and a verly light color.

Example VI

A blowing agent was prepared by the action of sulfur dioxide and carbon dioxide on hydrazine. It is believed to have the formula

NH₂—NH₃—SO₂—NH—NH—CO₂—NH₃—NH₂

When this material was substituted for dihydrazinium hydrazine disulfinate in Example I, substantially similar results were obtained.

Example VII

A polyvinyl chloride sponge was prepared from Geon 121, a powdered polyvinyl chloride. A thin paste was prepared by mixing together 40 parts by weight of Geon 121, 14 parts of dioctyl phthalate, 26 parts by weight of tricresyl phosphate, 1.6 parts by weight of an epoxy resin derived from a bis-phenol and epichlorohydrin and 8 parts by weight of diammonium hydrazine disulfinate. This paste was poured into a mold and cured at 320° F. for 12 minutes resulting in a sponge having very fine porosity and a very light color.

I claim:

1. The method of claim 12 in which the reaction product is diammonium hydrazinium disulfinate.

2. The method of claim 12 in which the reaction product is dihydrazinium hydrazine disulfinate.

3. The method of claim 12 in which the reaction product is ammonium hydrazinium hydrazine disulfinate.

4. The method of claim 12 in which the reaction product is diammonium hydrazinium carboxy sulfinate.

5. The method of claim 12 in which the reaction product is dihydrazinium hydrazine carboxy sulfinate.

6. The polymer composition of claim 13 in which the reaction product is diammonium hydrazinium disulfinate.

7. The polymer composition of claim 13 in which the reaction product is dihydrazinium hydrazine disulfinate.

8. The polymer composition of claim 13 in which the reaction product is ammonium hydrazinium hydrazine disulfinate.

9. The polymer composition of claim 13 in which the reaction product is diammonium hydrazine carboxy sulfinate.

10. The polymer composition of claim 13 in which the reaction product is dihydrazinium hydrazine carboxy sulfinate.

11. The method of making an expanded material which comprises incorporating a reaction product of hydrazine and sulfur dioxide having the formula:

$$H_2NNH_2 \cdot HO_2SNNSO_2H \cdot H_2NNH_2$$

with a vulcanizable rubber mix comprising natural rubber and a vulcanizing agent therefor, shaping the resulting mixture, heating to decompose the said reaction product and to cure the rubber in its expanded condition.

12. The method of making an expanded material which comprises incorporating in a polymeric material selected from the group consisting of rubber, polyvinyl chloride and polyethylene a small amount of a reaction product of a nitrogen-containing material selected from the group consisting of hydrazine and mixtures of hydrazine and ammonia with an oxygen-containing material selected from the group consisting of sulfur dioxide and mixtures of sulfur dioxide and carbon dioxide containing up to 50 percent sulfur dioxide, said reaction product having the formula:

$$Y—XO_2—NH—NH—SO_2—Y$$

in which X is an atom selected from the group consisting of carbon and sulfur and in which Y is a radical selected from the group consisting of hydrazinium and ammonium radicals, and heating the resulting polymeric composition to decompose said reaction product.

13. A polymer composition comprising a polymeric material selected from the group consisting of rubber, polyvinyl chloride and polyethylene, and a small amount of a reaction product of a nitrogen-containing material selected from the group consisting of hydrazine and mixtures of hydrazine and ammonia with an oxygen-containing material selected from the group consisting of sulfur dioxide and mixtures of sulfur dioxide and carbon dioxide containing up to 50 percent sulfur dioxide, said reaction product having the formula:

$$Y—XO_2—NH—NH—SO_2—Y$$

in which X is an atom selected from the group consisting of carbon and sulfur and in which Y is a radical selected from the group consisting of hydrazinium and ammonium radicals.

References Cited in the file of this patent

UNITED STATES PATENTS

| | | |
|---|---|---|
| 2,299,593 | Roberts et al. | Oct. 20, 1942 |
| 2,529,512 | Ott | Nov. 14, 1950 |
| 2,544,483 | Baum | Mar. 6, 1951 |
| 2,552,065 | Schoene | May 8, 1951 |
| 2,621,161 | Kulp et al. | Dec. 9, 1952 |
| 2,626,933 | Lober et al. | Jan. 27, 1953 |

FOREIGN PATENTS

| | | |
|---|---|---|
| 821,423 | Germany | Nov. 19, 1951 |

OTHER REFERENCES

Berichte der Deutschen Chemischen Gesellschaft, volume 44, pages 389–90 (1911).